(12) United States Patent
Noma et al.

(10) Patent No.: US 6,307,881 B1
(45) Date of Patent: Oct. 23, 2001

(54) MODEM CONTROL METHOD

(75) Inventors: Nobuhiko Noma, Yokohama; Tsukasa Sakai, Kamakura; Genzou Takagi, Ageo, all of (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/117,176

(22) PCT Filed: Dec. 11, 1997

(86) PCT No.: PCT/JP97/04556

§ 371 Date: Jul. 29, 1998

§ 102(e) Date: Jul. 29, 1998

(87) PCT Pub. No.: WO98/26581

PCT Pub. Date: Jun. 18, 1998

(30) Foreign Application Priority Data

Dec. 11, 1996 (JP) .................................... 8-330537

(51) Int. Cl.[7] ................................. H04B 1/38; H04L 5/16
(52) U.S. Cl. ........................ 375/222; 375/220; 375/221; 370/506; 370/509; 358/434; 358/436; 358/437
(58) Field of Search ..................... 375/222, 219, 375/220, 221; 370/278, 282, 287, 300, 353, 355, 356, 425, 426, 450, 453, 458, 459, 496, 506, 509; 358/434, 436, 437, 409

(56) References Cited

U.S. PATENT DOCUMENTS 4,897,831  1/1990  Negi et al. .
5,995,239 * 11/1999  Kagawa et al. ....................... 358/405

FOREIGN PATENT DOCUMENTS 4017298   12/1990  (DE) .
724355    7/1996   (EP) .
8-214136  8/1996   (JP) .

OTHER PUBLICATIONS

English Language Abstract of JP No. 8–214136.
V.34 Recommendation, pp. 1–2 and 40–64.
T.30 Annex F Recommendation, pp. 131–138.
T.4 Recommendation, pp. 14–15.

* cited by examiner

Primary Examiner—Mohammad H. Ghayour
(74) Attorney, Agent, or Firm—Greenblum & Bernstein, P.L.C.

(57) ABSTRACT

When carrying out pre-processing of image signal transmission using the control channel of a full-duplex modem and switching image signal transmission to the primary channel of a half-duplex modem, the answer modem stops the transmission carrier upon confirmation that all "1" signals with 40 bit or more have been received from the calling modem, restarts the reception of all "1" signals after the elapse of a certain period of time, confirms the end of all "1" signals and switches to the primary channel.

15 Claims, 8 Drawing Sheets

MODEM CONTROL METHOD

TECHNICAL FIELD

The present invention relates to modem control methods when a full-duplex modem is switched to a half-duplex modem. Particularly, it relates to control methods of a V.34 facsimile modem which uses a V.34 Recommendation modem established at the SG14 conference of the ITU (International Telecommunication Union) held in June 1994 and communicates through a T.30 Recommendation ANNEX-F communication procedure approved by mail voting at the SG8 conference of the ITU held in July 1996.

BACKGROUND ART

Figure 1:
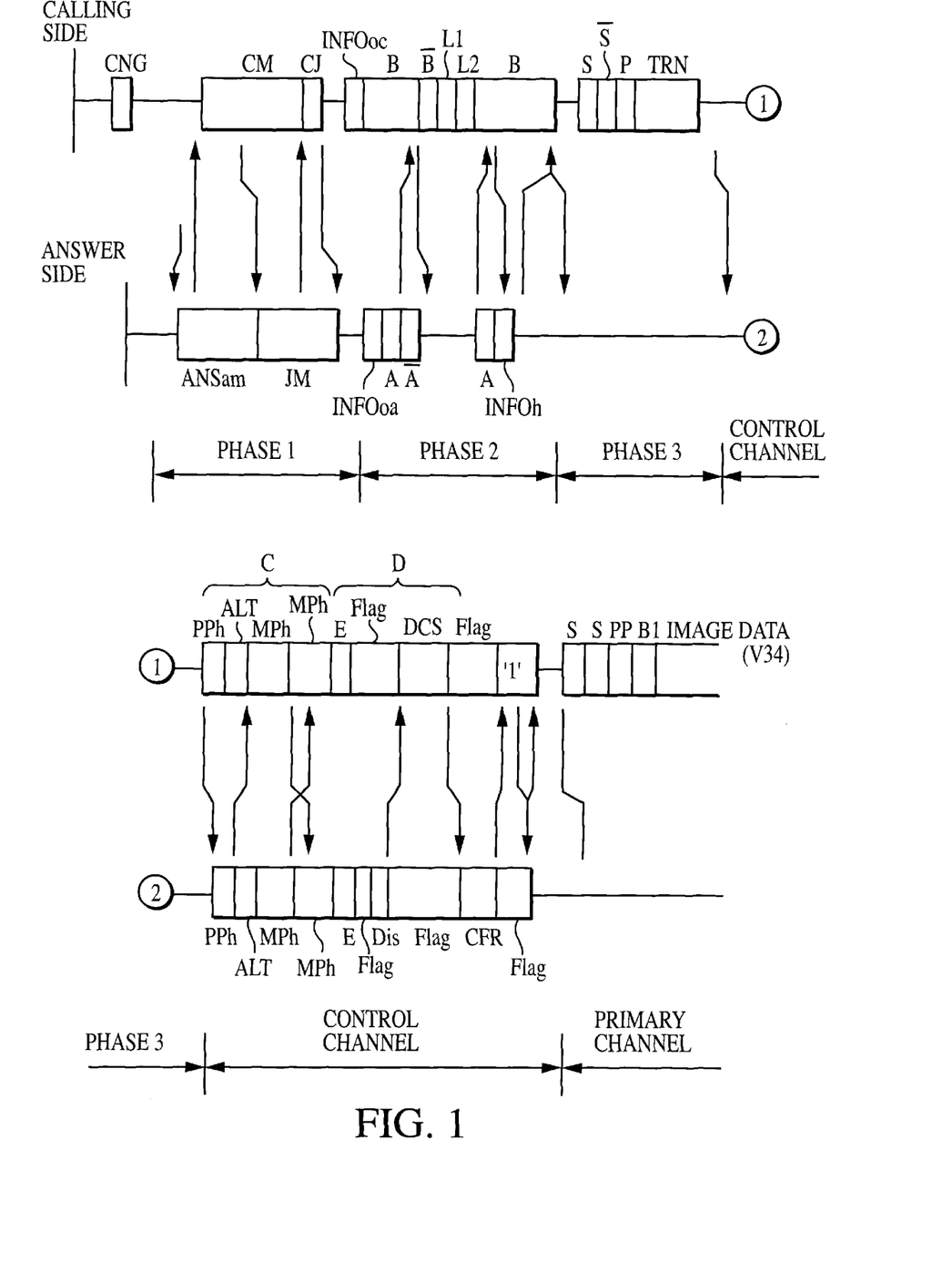
FIG. 1 is a schematic diagram showing the overall T.30 ANNEX-F procedure in a V.34 facsimile modem.

The communication protocol based on the current V.34 Recommendation and T.30 Recommendation ANNEX-F uses a full-duplex modem up to the control channel and a half-duplex modem for the primary channel which transmits image information. In this way, it switches over between these modems. FIG. 1 shows the communication protocol.

In FIG. 1, phase 1 is a section of exchange between a CM signal (calling menu signal) and JM signal (common menu signal). This section selects a modulation mode available to the calling and answer modems. Phase 2 is a section called "line probing." L1 and L2 each includes simultaneous transmissions of 21 single-frequencies from 150 Hz to 3750 Hz, and are used to probe the amplitude characteristic of the line viewed from the answer modem. INFO is a communication capacity information signal and A, A, B, and B indicate the ACK (Acknowledge) signals that receive INFO.

Phase 3 is a primary channel preparation stage which transmits V.34 image signal data which will be described later and corresponds to the period of transmission of a long training signal (long synchronization signal). The frequency band (or symbol rate) is determined based on the probing result of the line amplitude characteristic of the L1 and L2 signals in phase 2.

The control channel includes signals represented by C and D. Part C is the section in which parameters for the modem itself are mainly exchanged, determining the signal rate of the image signal data transmitted based on a modulation system called "primary channel" which comes later. Part D is a section to exchange control information as the facsimile terminal and is controlled according to commands such as DIS (Digital Identification Signal) and DCS (Digital Command Signal) described in the T.30 Recommendation.

A signal called "MPh (Modem Parameter Exchange)" of part C contains a bit (bit 50 in MPh) which determines whether or not to accept asymmetric transmission rates of 1200 bps and 2400 bps as the transmission rate of part B in the same control channel and is further provided with another bit (bit 27 in MPh) which requests the answer modem to transmit part B at either 1200 bps or 2400 bps.

At present, the T.30 ANNEX-F does not accept asymmetric transmission rates in FAX transmissions by setting MPh bit 50 to "0". When a symmetric rate transmission is selected, if the requested transmission rate differs between the calling and answer modems, transmission of part D is designed to be carried out according to the lower rate side. In a current FAX which incorporates a V.34 modem, the transmission rate of part D of this control channel is preset to either 1200 bps or 2400 bps.

The primary channel includes facsimile image information data which is transmitted by a modulation system called "V.34 primary channel" and a short training signal (short synchronization signal) which precedes the facsimile image information data. The data signal rate of this image information part is determined by the transmission/reception of the aforementioned MPh signal of part C of the control channel.

Figure 2:
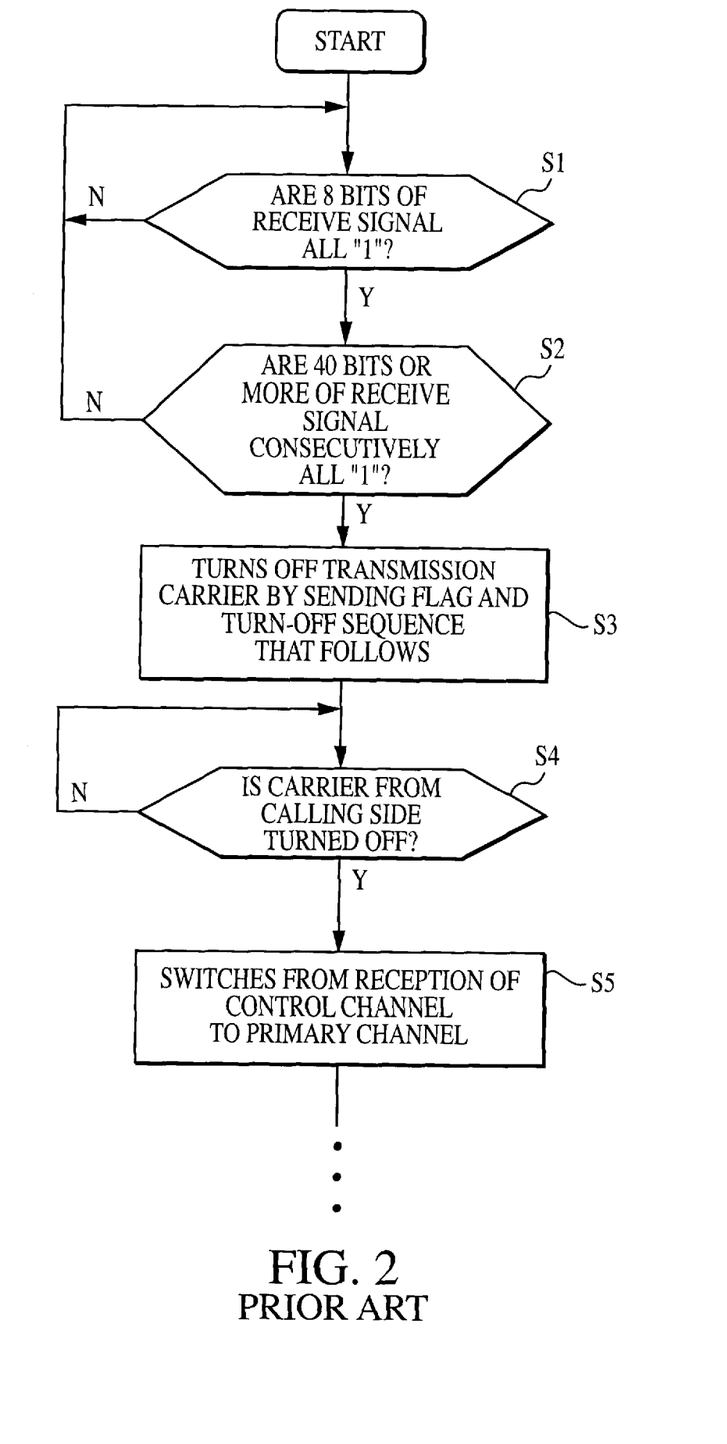
FIG. 2 is a flowchart showing the conventional method of switching the reception from the control channel to the primary channel.

FIG. 2 is a flowchart that shows a switchover from the end of the control channel program to the primary channel on the answer modem. FIG. 2 shows the operation of the control channel in FIG. 1 when the answer modem transmits a CFR signal (CONFIRMATION TO RECEIVE signal: based on T.30 Recommendation), then a Flag pattern (a series of "7E"s in hexadecimals: based on T.30 Recommendation) and waits for all "1" signals of at least 40 bits from the calling modem.

Since each symbol of the control channel of the V.34 Recommendation consists of 2 bits or 4 bits, the answer modem normally judges data for every short bits such as 2 bits, 4 bits or 8 bits. Therefore, it judges whether the data is all "1" or not for every 8 short bits (S1). Furthermore, it judges whether all "1" receive signals consist of at least 40 bits or not according to the ANNEX-F of the T.30 Recommendation (S2). When it is confirmed that the receive signal contains a series of "1"s for at least 40 bits, the Flag signal that was being transmitted is cut and transmitted with a turn-off sequence of the V.34 Recommendation (all "1" signal in a short period) added and then signal transmission is stopped (S3).

In response to this, the calling modem waits until the carrier from the answer modem turns off, and stops transmission of all "1" signals, adds a turn-off sequence, then turns off signal transmission. The answer modem monitors the carrier from the calling modem turn off (S4) and if it confirms that this carrier turns off, then closes the reception of the control channel and switches to the reception of the primary channel (S5).

However, since the switching method above switches the reception mode after detecting that the carrier from the calling modem turns off, it has the problem of easily missing the switching timing. In addition, this method of switching to the receive mode after detecting that the carrier turns off, no matter how secure it may appear, actually has a disadvantage of the modem having difficulty in catching the signal-off section if line noise of −43 dBm or greater exists on the line. Without detecting this signal-off section, the switching of the primary channel is impossible, making it impossible to receive image information data. The T.4 Recommendation stipulates that a facsimile apparatus should operate normally when the receive signal level ranges 0 dBm to −43 dBm and the transmit output should be made adjustable from −15 dBm to 0 dEm.

One of the methods to switch from the control channel to the primary channel is a method in which the answer modem continues reception and demodulation irrespective of whether the carrier from the calling modem turns on/off, detects the timing at which all "1" receive data is changed to data other than all "1" data and then switches to the reception of the primary channel. However, if a considerable amount of delay is introduced into the line, this system has the problem of provoking switching timing errors as shown below in the case of communications with overseas for instance, resulting in a failure in the reception of the primary channel.

Figure 3:
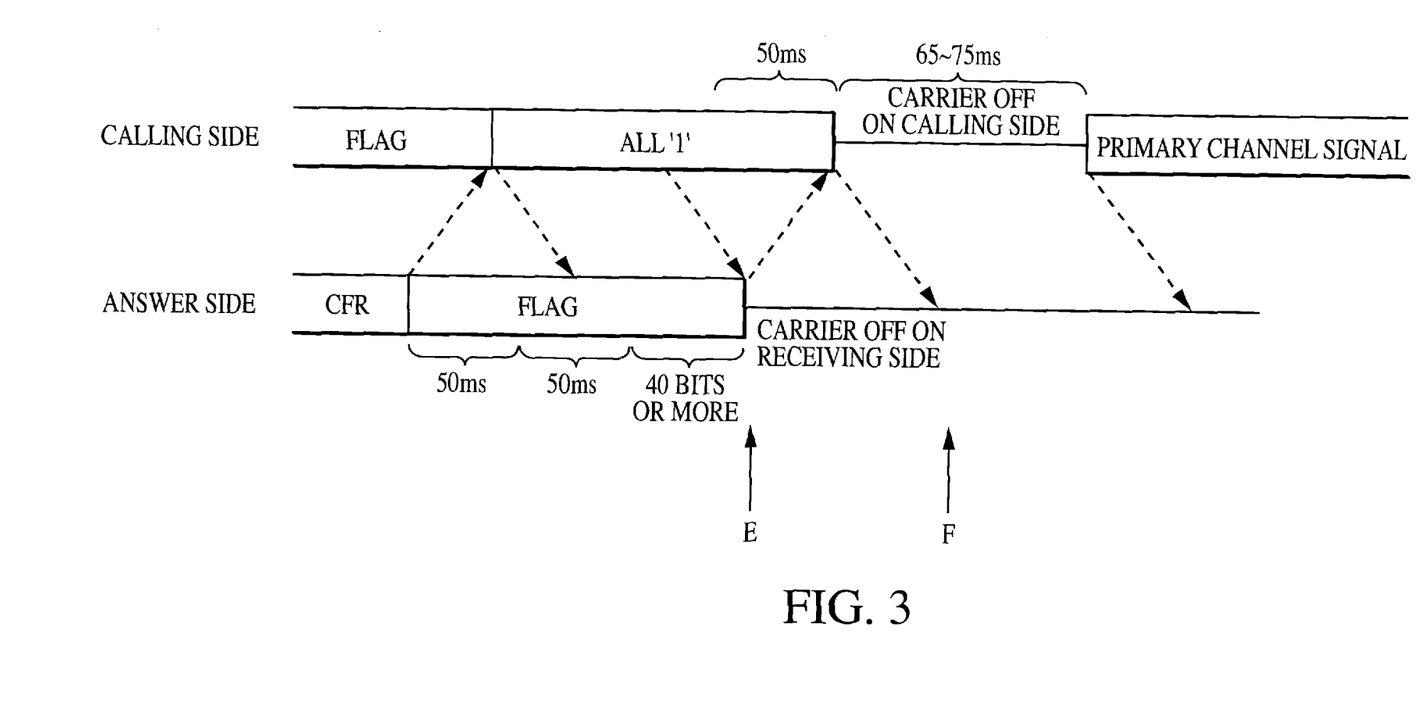
FIG. 3 is a timing chart to explain the conventional method of switching the reception from the control channel to the primary channel.

FIG. 3 is a timing chart that shows the terminating timing of the control channel assuming that a delay of 50 ms has occurred. If there is no line delay, the answer modem turns off its carrier when it confirms 40 bits of all "1" signals from the calling modem, and thus the calling modem also detects the carrier-off and stops transmission of all "1". The answer modem detects the stoppage of transmission and switches to the primary channel. This switching is performed with the timing of E.

In the case of a delay of 50 ms, if the answer modem confirms 40 bits of all "1" signals and turns off the carrier, the calling modem detects it 50 ms after point E and turns off the transmission of all "1". It is at point F, 50 ms later, that this transmission-off is detected on the answer modem. Therefore, the answer modem switches to the primary channel at this point F.

As shown above, if there is a large amount of delay in the circuit and great attenuation in both directions on the line, for example, if there is a great level difference between the transmission level of −15 dBm and incoming level of −43 dBm, the answer modem is likely to erroneously switch from the control channel to the primary channel with the timing of E.

Figure 4:
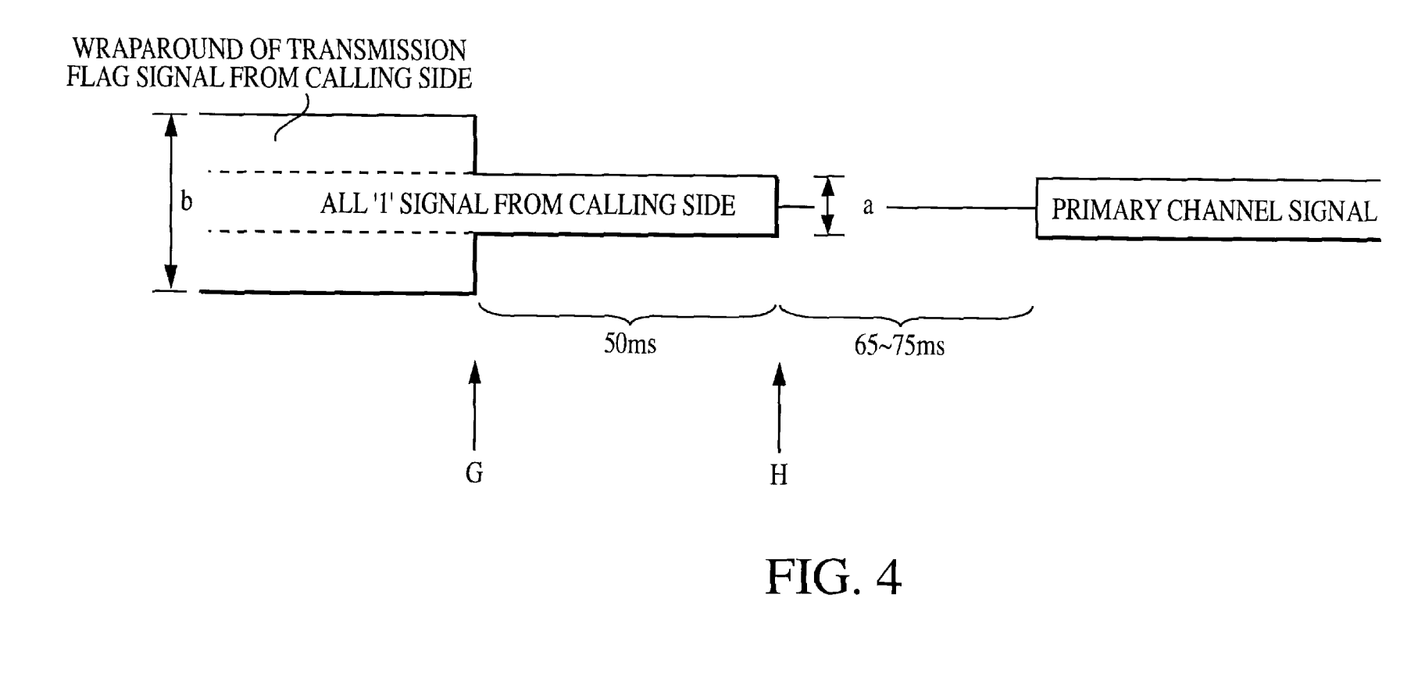
FIG. 4 is a schematic diagram to explain conventional problems in switching the reception from the control channel to the primary channel.

FIG. 4 shows a transmission wraparound at the answer modem and the receive signal from the calling modem. The signal having a width of "a" indicates an all "1" transmit signal from the calling modem and shows considerable attenuation due to circuit attenuation. The signal having a width of "b" indicates a wraparound signal of the Flag signal on the answer modem and is a large signal because it is not attenuated. The ratio b/a is as great as 20. If there is no circuit attenuation, "a" approximates to "b". For example, if the transmit signal from the answer modem becomes a near-end echo of the exchange and returns to the answer modem without attenuation, the amplitude of the wraparound signal from the answer modem may grow approximately 20 times in size compared to the amplitude of the incoming signal from the calling modem at the input of the A/D converter.

With the timing of G in FIG. 4, the carrier is turned off after a 40-bit signal is received, and therefore the transmission wraparound from the answer modem is cut off. This reduces the amplitude considerably from "b" to "a", making it easier to produce bit errors. That is, waiting for the all "1" signal to terminate while simply checking the all "1" signal from a point just before G in FIG. 4 is likely to switch to the reception of the primary channel with the timing of G erroneously. Switching with this timing will receive the control channel signal (all "1" signal) in receive mode of the primary channel. This timing error will result in a failure in the reception of the primary channel.

DISCLOSURE OF INVENTION

The present invention has been implemented in view of the problems above. Its objective is to provide modem control methods which will assure the switching from a full-duplex modem to a half-duplex modem even in the case that the line has a large delay and attenuation.

This objective is achieved by modem control methods in which the control channel of a full-duplex mode is switched to the primary channel of a half-duplex modem as follows: When an all "1" termination request signal of 40 bits or more which indicates a control channel termination request from the calling modem is received, it is first confirmed that the signal received from the calling modem is an all "1" 40-bit signal and then transmission to the calling modem is stopped. The confirmation of the reception of the all "1" signal from the calling modem is ignored for a certain period of time, then the confirmation of the reception of the all "1" signal is restarted. When the termination of the reception of the all "1" signal is confirmed, the control channel of the full-duplex modem is switched to the reception of the primary channel of the half-duplex modem. This assures the switching from the control channel to the primary channel.

BEST MODE FOR CARRYING OUT THE INVENTION

In facsimile transmissions, the modem control methods of the present invention implement pre-processing of image signal transmission through a full-duplex modem and then switches to image signal transmission through a half-duplex modem. When transmission through the full-duplex modem is completed, if a termination request from the calling modem is to transmit a series of unit signals comprised of prescribed bits, a prescribed number of said unit signals are received from the calling modem, then transmission to the calling modem is stopped, and the reception of said unit signals from the calling modem is ignored for a certain period of time, and then the reception of said unit signals is restarted and upon completion of the reception of these unit signals the process is switched to the reception through the half-duplex modem.

If a termination request from the calling modem is to transmit a series of unit signals combining prescribed bits, the answer modem stops transmission to the calling modem upon reception of a prescribed number of these unit signals. In the meantime, the calling modem continues to transmit unit signals, but the answer modem ignores the reception of those unit signals for a certain period of time, after which it restarts receiving unit signals. When it detects that transmission from the answer modem has been completed, the calling modem stops transmitting unit signals thereafter. The answer modem detects termination of these unit signals and switches from the full-duplex modem to the half-duplex modem.

If there is no delay on the line, the time at which the answer modem has completed transmission, the time at which the calling modem has completed unit signals by this completion of transmission and the time at which the answer modem detects this completion are almost the same, and therefore even if the answer modem switches from the full-duplex modem to the half-duplex modem there will be no problem. However, if some delay is produced on the line, these three points will not coincide and especially the output of receive signals will change greatly when the answer modem completes transmission, which is likely to cause this point to be mistaken for the time of completion of unit signals.

The present invention stops the reception of signals during this period susceptible to mistaking for a prescribed period of time and restarts the reception when receive signals are stabilized, detects the end of unit signals correctly and switches to the half-duplex modem.

To be concrete, the present invention uses an ITU Recommendation V.34 facsimile modem, carries out the preprocessing of image signal transmission by the control channel of the full-duplex modem in compliance with the ITU Recommendation V.30 ANNEX-F. When switching to the primary channel of the half-duplex modem for image signal transmission, upon reception of a termination request signal of at least 40 all "1" bits which indicates a request for termination of the control channel from the calling modem, it first confirms that the signal received form the calling modem is a signal of at least 40 all "1" bits, and stops the transmission to the calling modem, then ignores the reception of all "1" signals from the calling modem for a certain period of time, after which it restarts the reception of all "1" signals, and after confirming the end of the reception of the all "1" signal, switches to the primary channel.

In other words, the calling modem transmits a series of all "1" bits of the control channel termination request and when 40 bits or more are received the answer modem stops the transmission to the calling modem, and after the elapse of a certain period of time it restarts the reception of all "1" signals. When the transmission from the answer modem is stopped, the calling modem stops the transmission of all "1" signals. The answer modem detects the stoppage of these all "1" signals and switches to the primary channel.

If there is no delay on the circuit, the time after the answer modem stops the transmission until the stoppage of all "1" signals from the calling modem is detected is short, and thus there will be no problem even if the answer modem switches to the primary channel a short time after the transmission is stopped. However, if there is some delay on the line, the time after the answer modem stops the transmission until the stoppage of all "1" signals from the calling modem is detected will increase. The signal received by the answer modem contains a large percentage of echoes of the signal sent by itself and if the answer modem stops the transmission, this echo attenuates and the receive level is reduced with the result that this reduction of the receive level is likely to be mistaken for the stoppage of all "1" signals from the calling modem causing the answer modem to switch to the primary channel.

The control method of the present invention stops the reception of all "1" signals during this period susceptible to errors and restarts the reception after the receive signals are stabilized. Thus, it can detect the end of all "1" signals correctly and switch to the primary channel correctly. Large attenuation on the line may further increase variations of the signal level when an echo disappears, while it may reduce the receive level of all "1" signals after the answer modem stops the transmission. However, the control methods of the present invention receive all "1" signals in a period in which the receive signals are stabilized, providing a reliable method for the detection of the end of all "1" signals.

Furthermore, the control methods of the present invention set the operation of an AGC (Automatic Gain Control) circuit which adjusts the gain of the receive signals to fixed mode starting immediately before the confirmation of the reception of all "1" signals from the calling modem is ignored for a given time until the switching to the reception of the primary channel is completed.

The AGC circuit that adjusts the gain of receive signals is normally set to variable mode and if the receive level is reduced, it tries to restore this to the original level to maintain a certain level. However, if this is changed to fixed mode, the AGC stops its function and when the receive level reduces, it retains that low level. When the signal level changes, trying to restore this to the original level is likely to cause bit errors. Thus, the answer modem sets the AGC to fixed mode during a period in which the signal level is prone to change, and detects the time of the end of all "1" signals correctly and switches to the primary channel correctly.

With reference now to the attached drawings, the embodiment of the present invention is explained below.

Figure 5:
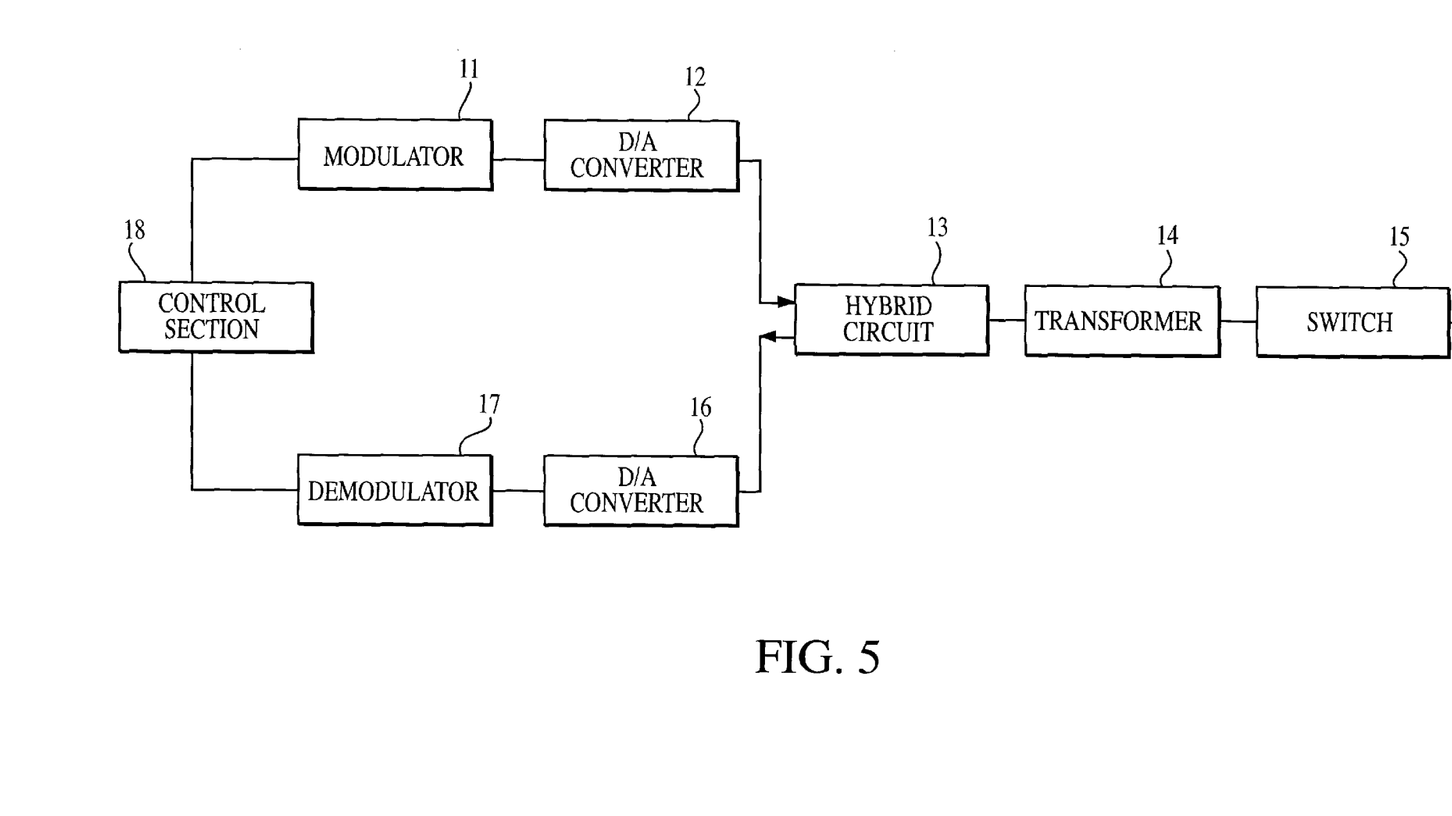
FIG. 5 is a schematic section diagram showing the main components of a V.34 control channel modem configuration of the present invention.

FIG. 5 is a section diagram showing the main components of the answer modem of the modem of the present invention. This modem mainly comprises modulator 11 that modulates data, D/A converter 12 that digital/analog converts the modulated data, hybrid circuit 13 that switches transmission direction in two directions, transformer 14, switch 15 that switches transmission and reception, A/D converter 16 that analog/digital converts signals from the calling modem, demodulator 17 that demodulates the converted data and control section 18 that controls channel switching.

In the configuration above, a signal is modulated by modulator 11, D/A converted by D/A converter 12 and this signal is transmitted from switch 15 to the calling modem. A signal from the calling modem is received through switch 15, A/D converted by A/D converter 16 and demodulated by demodulator 17.

Figure 6:
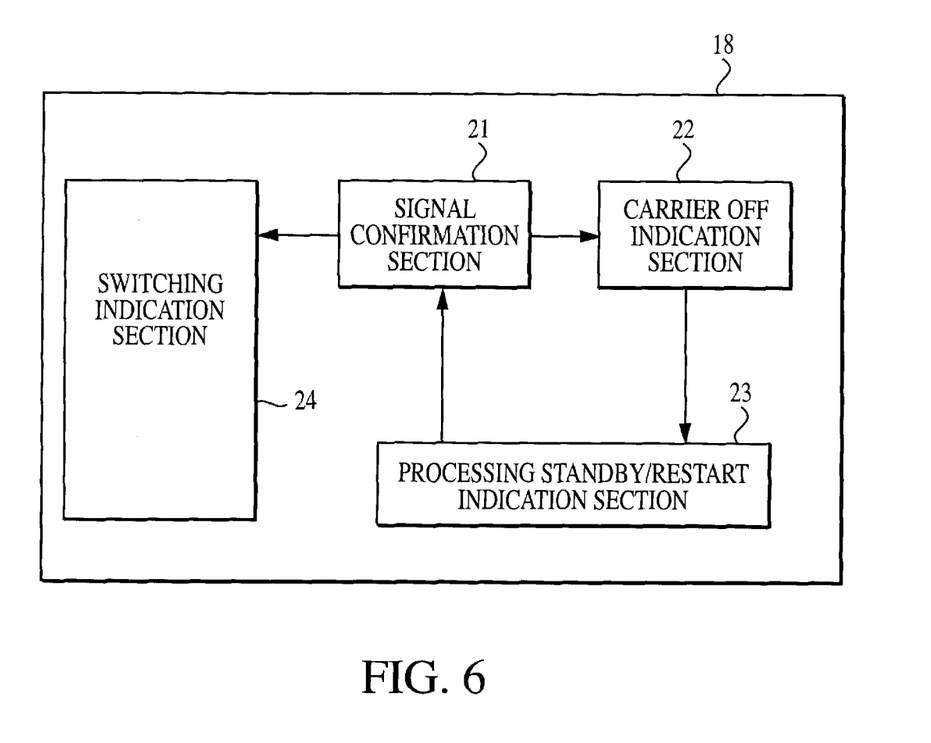
FIG. 6 is a section diagram to explain the control section of the modem shown in FIG. 5.

As shown in FIG. 6, control section 18 comprises signal confirmation section 21 that confirms whether a signal from the calling modem is an all "1" signal or not, carrier-off indication section 22 that indicates transmission carrier-off based on the output from signal confirmation section 21, processing standby/restart indication section 23 that controls indications of standby and restart of the processing based on the output of carrier-off indication section 22 and switching indication section 24 that switches the reception from the control channel to the primary channel based on the output from signal confirmation section 21.

When signal confirmation section 21 receives an all "1" signal and confirms that there is a series of "1"s by a prescribed number of bits, control section 18 outputs a transmission carrier-off indication to carrier-off indication section 22. Based on this signal, carrier-off indication section 22 indicates transmission carrier off. Based on this indication, processing standby/restart indication section 23 ignores the reception of all "1" signals from the calling modem for a certain period of time and holds the processing in standby mode. Then, after the elapse of a certain period of time, processing standby/restart indication section 23 indicates the restart of the reception of the all "1" signal. Based on this indication, if the receive signal is not an all "1" signal, signal confirmation section 21 indicates it to switching indication section 24, which in turn indicates a switchover from the reception of the control channel to the reception of the primary channel.

Figure 7:
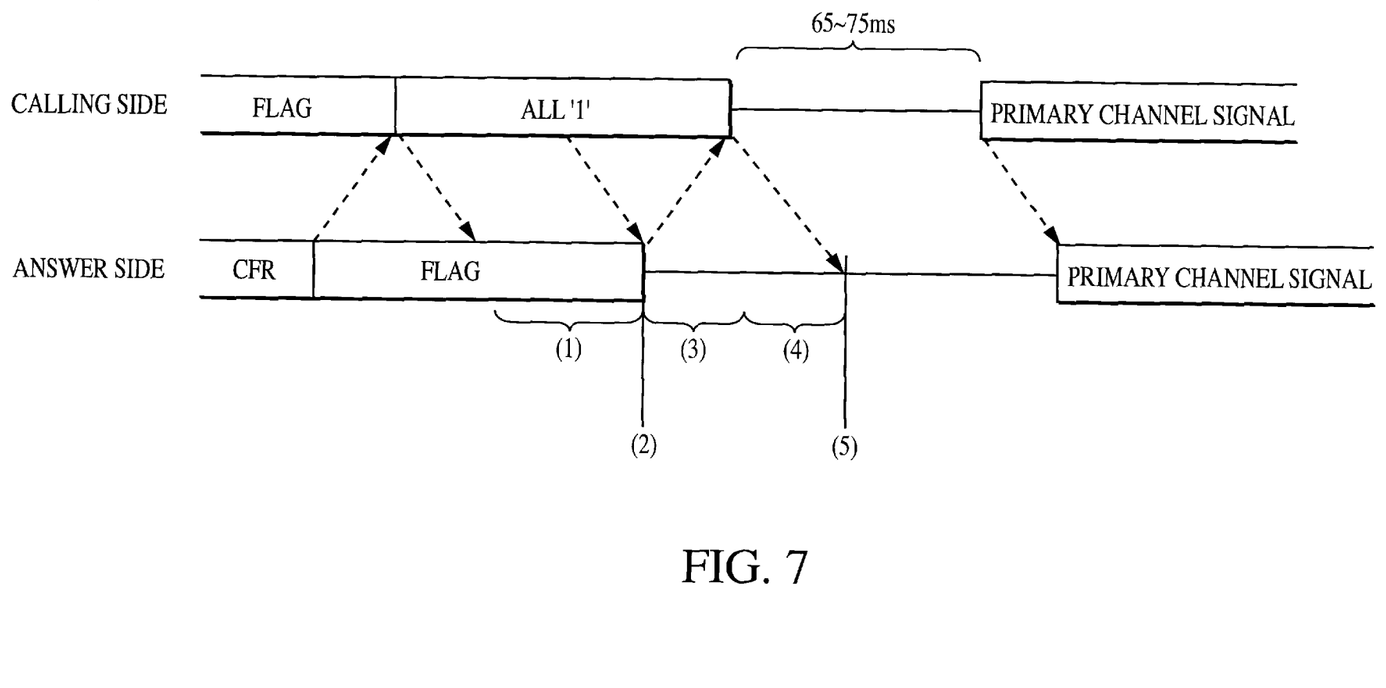
FIG. 7 is a diagram to explain the switching of reception from the control channel to the primary channel in the control method of the present invention.
Figure 8:
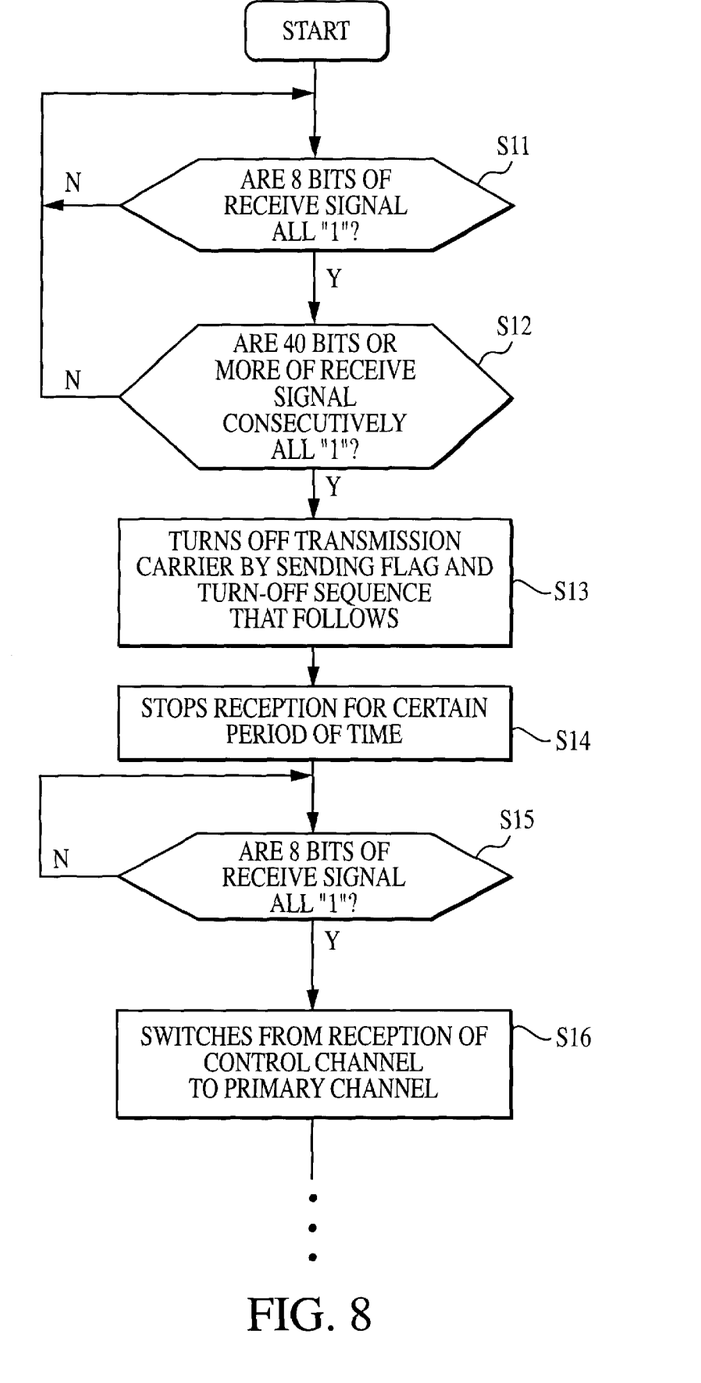
FIG. 8 is a flowchart of the control method of the present invention.

Then, the following illustrates the case where the control method of the present invention is carried out using a modem with the configuration described above. FIG. 7 is schematic diagram to explain the control method of the present invention. FIG. 8 is a flowchart showing the algorithm of the operation in FIG. 7. Suppose a delay of 50 ms, for example, has occurred on the line. Suppose the calling modem transmits a Flag signal made up of "7E" in hexadecimals, while the answer modem transmits a CFR (Confirmation to Receive) signal. If the calling modem confirms the CFR signal, it transmits an all "1" signal which is a signal with a series of "1"s.

Then, when the transmission of the CFR signal is completed, the answer modem transmits the 7E Flag signal while receiving the all "1" signal. It receives the all "1" signal, for example, in 8-bit units and confirms that they are "1"s (S11). In this case, signals are received in 8-bit units, but signals can also be received in 4-bit or 2-bit units.

The answer modem confirms that the receive signal continues for 40 bits or more (S12). If this is confirmed, the transmission of Flag signals which has been in progress so far is cut off, a turn-off sequence (all "1" signal is transmitted for 6 ms) is added and the transmission carrier is turned off (S12). (1) in FIG. 7 shows the period of confirming the reception of 40 bits or more and (2) shows the time at which the transmit signal carrier is turned off.

The answer modem then ignores the reception of all "1" signals from the calling modem for a certain period of time (S14). This period corresponds to the delay on the line. Experimentally, 40 ms would be a reasonable value.

By ignoring all "1" signals for a certain period of time in this way, it is possible to prevent a switchover to the primary channel when the receive gain is drastically changed due to extinction of an echo when the transmission carrier is stopped, causing this change to be mistaken for the stoppage of all "1" signals by the calling modem. In other words, this period is a standby period in which the AGC operation of the receive circuit catches up with a drastic change of the amplitude of the incoming signal due to the stoppage of the transmission carrier and waits until the all "1" signal received is confirmed to be stabilized enough. This period corresponds to period (3) in FIG. 7.

When it confirms "off" of the transmission carrier from the answer modem, the calling modem restarts the transmission of all "1" signals. On the other hand, the answer modem restarts the reception of all "1" signals and if the receive signal is not an all "1" signal (S15), it switches from the reception of the control channel to the reception of the primary channel (S16). If the receive signal is all "1", the answer modem continues the reception in control channel mode until a "non-1" signal is received. If at least a single "non-1" bit signal is found, it only needs to switch to the reception of the primary channel.

In FIG. 7, (4) indicates the next period of the reception of all "1" signals. (5) indicates the time at which "non-1" signals are confirmed, then a switchover is made from the control channel to the primary channel. The calling modem transmits primary channel signals 65 to 75 ms after an all "1" signal is stopped and starts the transmission of image signals.

In the embodiment above, the answer modem operates the AGC during the reception of the control channel. In the present invention, it is also possible to fix the AGC immediately before the transmission carrier is turned off, that is, stop the AGC operation and continue to fix the AGC until the next stoppage of reception and until the confirmation of all "1" signals after restarting and receive the control channels under that condition. This prevents mistaking of bits due to variations of the receive level, securing the switching timing.

As explained above, when the pre-processing of image signal transmission is carried out by the full-duplex modem and then this is switched to the half-duplex modem to continue image signal transmission, the modem control method of the present invention stops the transmission carrier after a prescribed number of unit signals are received from the calling modem and carries out a switchover after confirming that the calling modem stops unit signals in response to this. In this method, the answer modem stops the reception for a certain period of time after the transmission carrier is stopped during which signal disturbance may occur and restarts the reception when the signal level is stabilized after a prescribed time, detects the time at which unit signals cease to be transmitted consecutively and switches to the half-duplex modem. This assures a switchover from the full-duplex modem to the half-duplex modem.

Especially when the system is compliant with the T.30 ANNEX-F using a V.34 facsimile modem, the unit signal becomes "1". On the other hand, until all "1" signals are stopped from immediately before the transmission carrier is stopped or until it is confirmed that signals have become "non-1" signals, the answer modem sets the AGC circuit of the receive circuit to fixed mode, making it possible to prevent mistaking of bits reliably and switch to the primary channel correctly.

Industrial Applicability

The modem control methods in the present invention are suitable for sending image information in facsimile transmissions and especially suitable for facsimile transmissions when a considerable amount of delay is introduced into the line.

What is claimed is:

1. A modem control method, comprising the steps of:
   confirming whether unit signals received from the calling modem continue for a prescribed number of bits or not;
   turning off the transmission carrier if said unit signals continue for a prescribed number of bits;
   holding the processing in standby mode for a certain period of time after the transmission carrier has been turned off;
   restarting the process after a certain period of time, receiving unit signals, and switching from the reception of the control channel to the reception of the primary channel when the reception of unit signals is completed.

2. The modem control method according to claim 1, wherein the AGC circuit of the receive circuit is set to fixed mode from immediately before the transmission carrier is turned off until the system holds the processing in standby mode.

3. The modem control method according to claim 1, wherein the AGC circuit of the receive circuit is set to fixed mode from immediately before the transmission carrier is turned off until the end of the reception of unit signals is confirmed after the processing is restarted.

4. The modem control method according to claim 1, wherein said certain period of time is a period until the received unit signals are confirmed to be stabilized enough.

5. The modem control method according to claim 1, wherein said certain period of time is set according to a delay on the line.

6. The modem control method according to claim 1, which uses an ITU Recommendation V.34 facsimile modem and is compliant with the ITU Recommendation T.30 ANNEX-F.

7. The modem control method according to claim 6, wherein unit signals are "1"s.

8. A modem control method which carries out the pre-processing of image signal transmission in facsimile transmissions using a full-duplex modem and then performs image signal transmission by a half-duplex modem, wherein if, upon termination of the full-duplex modem, a request for termination from the calling modem to transmit unit signals made up of prescribed bits continuously, a prescribed number of said unit signals are received from the calling modem first, the transmission to the calling modem is stopped, the reception of said unit signals from the calling modem is ignored for a certain period of time, then the reception of said unit signals is restarted and the process is switched over to the reception by the half-duplex modem when the reception of these unit signals is completed.

9. A modem control method which uses an ITU Recommendation V.34 facsimile modem, carries out the pre-processing of image signal transmission using the control channel of a full-duplex modem in compliance with the ITU Recommendation T.30 ANNEX-F, and carries out image signal transmission by switching to the primary channel of a half-duplex modem, wherein upon reception of a termination request signal of at least 40 all "1" bits indicating a request for control channel termination from the calling modem, after confirming that signals received from the calling modem are all "1" signals with 40 bits or more, the transmission to the calling modem is stopped, the reception of all "1" signals from the calling modem is ignored, then the reception of all "1" signals is restarted, and the process is switched over to the primary channel after confirming the end of reception of those all "1" signals.

10. The modem control method according to claim 9, which sets the operation of the AGC circuit which adjusts the gain of the receive signal to fixed mode from immediately before the confirmation of reception of all "1" signals from the calling modem is ignored for a certain period of time until a switchover to the reception of the primary channel is completed.

11. A modem control apparatus, comprising:
    signal confirmation means for confirming whether a signal from the calling modem is a unit signal or not;
    carrier-off indication means for indicating transmission carrier off based on the output from said signal confirmation means;
    processing standby/restart indication means for controlling indications of processing standby and processing restarting based on the output from the carrier off indication means;
    switching indication means for switching from the reception of the control channel to the reception of the primary channel based on the output from the signal confirmation means after restarting the processing.

12. The modem control apparatus according to claim 11, wherein signal confirmation means receives unit signals from the calling modem and confirms whether the unit signals continue for a prescribed number of bits.

13. The modem control apparatus according to claim 11, wherein in the case that the unit signals continue for a prescribed number of bits, the carrier off indication means indicates to turn off the transmission carrier.

14. The modem control apparatus according to claim 11, wherein after turning off the transmission carrier, the processing standby/restart indication means holds the processing in standby mode for a certain period of time and restarts the processing after the elapse of said period.

15. The modem control apparatus according to claim 11, wherein after restarting the processing, the switching indication means receives unit signals and switches from the reception of the control channel to the reception of the primary channel when the reception of unit signals is completed.

* * * * *